(12) United States Patent
Kanteti et al.

(10) Patent No.: US 12,314,593 B2
(45) Date of Patent: *May 27, 2025

(54) ZONE BLOCK STAGING COMPONENT FOR A MEMORY SUB-SYSTEM WITH ZONED NAMESPACE

(71) Applicant: Micron Technology, Inc., Boise, ID (US)

(72) Inventors: Kumar V K H Kanteti, Sunnyvale, CA (US); Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,638

(22) Filed: Oct. 2, 2023

(65) Prior Publication Data

US 2024/0028239 A1  Jan. 25, 2024

Related U.S. Application Data

(63) Continuation of application No. 17/301,213, filed on Mar. 29, 2021, now Pat. No. 11,816,345.

(51) Int. Cl.
*G06F 3/06* (2006.01)

(52) U.S. Cl.
CPC .......... *G06F 3/0647* (2013.01); *G06F 3/0608* (2013.01); *G06F 3/064* (2013.01); *G06F 3/0659* (2013.01); *G06F 3/0688* (2013.01)

(58) Field of Classification Search
None
See application file for complete search history.

(56) References Cited

U.S. PATENT DOCUMENTS

2020/0089407 A1  3/2020  Baca
2020/0167274 A1*  5/2020  Bahirat .............. G06F 12/0246
(Continued)

FOREIGN PATENT DOCUMENTS

CN      105027090 A    11/2015
CN      107845394 A     3/2018
(Continued)

OTHER PUBLICATIONS

Office Action for China Patent Application No. 202210330019.7, dated Dec. 10, 2024, 10 pages. (Best available copy).

*Primary Examiner* — Michael Alsip
(74) *Attorney, Agent, or Firm* — LOWENSTEIN SANDLER LLP

(57) ABSTRACT

A memory sub-system can determine a block granularity for an input/output (I/O) data stream received from a host system. The memory sub-system can determine that the block granularity is different than a memory block granularity of a first memory region in a first namespace of the one or more memory devices, where the first memory region is to store the I/O data stream. The memory sub-system can accumulate blocks from the I/O data stream in a second memory region in a second namespace of the one or more memory devices. Responsive to a capacity of the accumulated blocks in the second memory region satisfying a threshold criterion, the memory sub-system can migrate the accumulated plurality of blocks from the second memory region to the first memory region.

20 Claims, 8 Drawing Sheets

(56) References Cited

U.S. PATENT DOCUMENTS

2020/0409589 A1   12/2020  Bennett
2021/0089217 A1    3/2021  Bjørling
2021/0318820 A1*  10/2021  Jin ........................ G06F 3/0673

FOREIGN PATENT DOCUMENTS

| CN | 109918352 A | 6/2019 |
| --- | --- | --- |
| CN | 111198651 A | 5/2020 |
| CN | 111344683 A | 6/2020 |
| CN | 112115069 A | 12/2020 |
| CN | 112115070 A | 12/2020 |

\* cited by examiner

| Logical Block Number (Block: 4kB) | Chunk Identifier | Zone Identifier |
|---|---|---|
| 0..15 | Chunk 0 | Zone 0 |
| 16..31 | Chunk 1 | Zone 0 |
| ... | ... | ... |

ZONE BLOCK STAGING COMPONENT FOR A MEMORY SUB-SYSTEM WITH ZONED NAMESPACE

RELATED APPLICATIONS

This application is a continuation of U.S. patent application Ser. No. 17/301,213, filed Mar. 29, 2021, the entire contents of which are hereby incorporated by reference herein.

TECHNICAL FIELD

Embodiments of the disclosure relate generally to memory sub-systems, and more specifically, relate to a zone block staging component for a memory sub-system with zoned namespace.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 7 illustrates an example of a mapping table for data chunks to map to zone blocks in accordance with some embodiments of the present disclosure.

DETAILED DESCRIPTION

Figure 1:
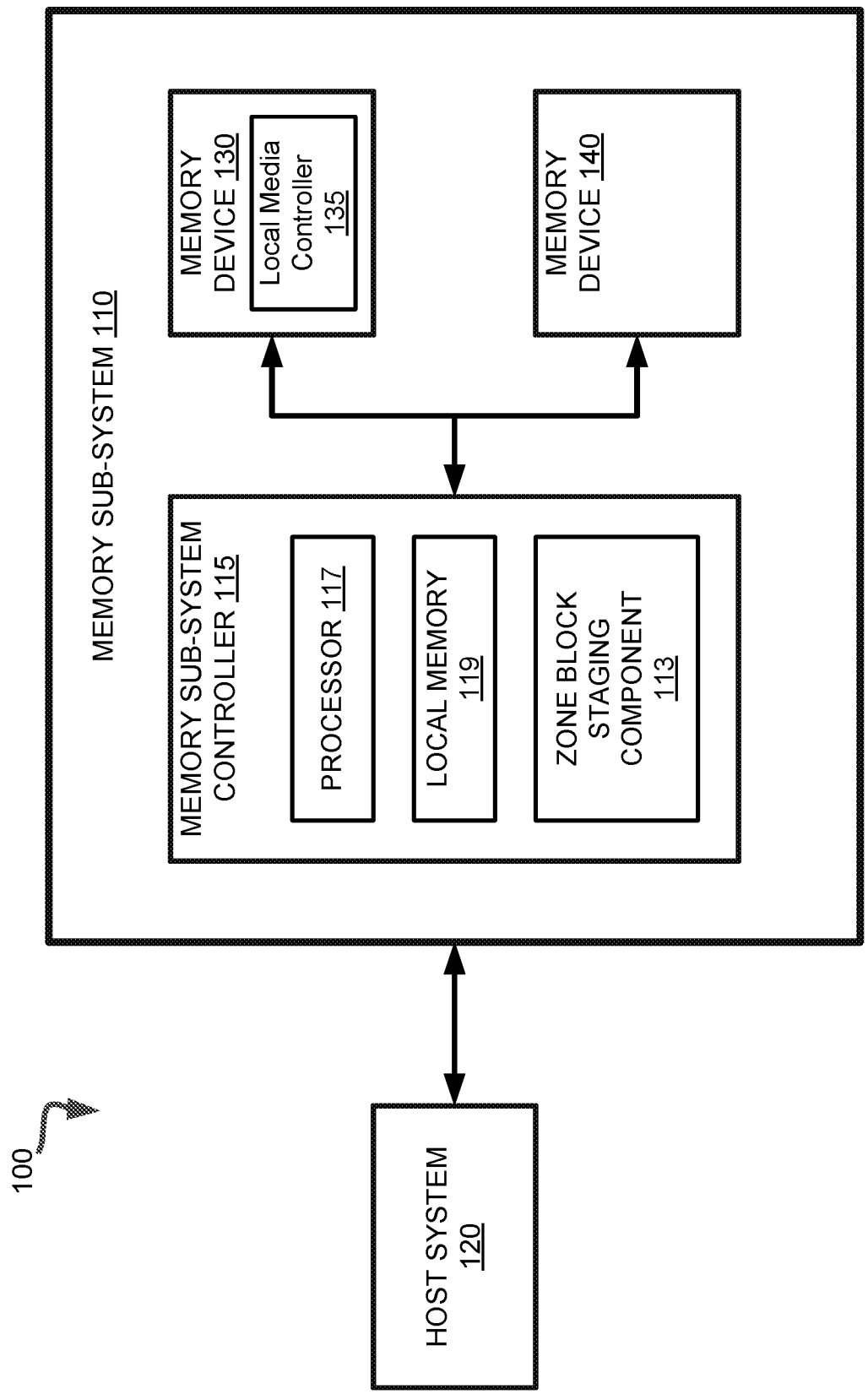
FIG. 1 illustrates an example computing system that includes a memory sub-system in accordance with some embodiments of the present disclosure.

Aspects of the present disclosure are directed to zone block staging for a memory sub-system with a zoned namespace. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A host system can send access requests (e.g., write commands, read commands) to the memory sub-system, such as to store data on a memory device at the memory sub-system and to read data from the memory device on the memory sub-system. The data to be read or written, as specified by a host request, can typically be performed through memory paging. Memory paging can be a memory management scheme used by a host system to store and retrieve data from storage (such as non-volatile memory) for use by main memory (or volatile memory). A page or a memory page is a fixed-length contiguous block of memory (or "block") and is the smallest unit of data managed by a memory sub-system. For example, certain systems have a page size of 4 KB. Other systems can have a page size of 8 KB or other multiples of 4 KB.

Certain memory devices are also configured with a zone namespace (zns). In a zone namespace, the address space of the memory device is divided into zones which allows for more efficient management of data as the capacity of the memory device increases. Host systems designed to work with conventional filesystems may face certain challenges when interacting with a memory device having a zone namespace, however. For example, conventional filesystems can write data in blocks as small as 4 kilobytes (KB) in size, while a zone namespace memory device can have an optimal write size that is in the range of approximately 100 KB (e.g., 64 KB, 128 KB, 196 KB).

Thus, in order to enable the use of zone namespace memory devices with conventional filesystems that do not support a zone block size, certain costly modifications may be required. For example, when 4 KB blocks are being written to a memory device having a zone namespace, a memory sub-system for the memory device can utilize a staging area to accumulate the blocks until the total size of the accumulated blocks is equal to or greater than a zone block size.

Aspects of the present disclosure address the above and other deficiencies by having a memory sub-system that provides a zone block staging area for a memory sub-system with a zone namespace. In one embodiment, the memory sub-system determines a block granularity for an input/ output (I/O) data stream received from a host system. The memory sub-system can determine that the granularity of a block is different than a granularity of a zone block for a zoned memory region in a memory device of the memory sub-system, where the zoned memory region is to store the I/O data stream. The memory sub-system can accumulate blocks from the I/O data stream in a conventional memory region in a memory device with a conventional namespace. Responsive to a capacity of the accumulated blocks in the conventional memory region reaching a size of the zone block, memory sub-system migrates the accumulated blocks from the conventional memory region to the zoned memory region. Advantages of the present disclosure include, but are not limited to, compatibility of conventional filesystems with a memory device having a zoned namespace.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a zone block staging component 113 that can perform a staging area for converting block of a first granularity to a zone block granularity. For example, zone block staging component 113 can accumulate blocks received from a host system in a staging area (a conventional memory region) in the memory sub-system. When the blocks reach a granularity of the zone block, zone block staging component 113 migrates the blocks to a zoned memory region. In some embodiments, the memory sub-system controller 115 includes at least a portion of the zone block staging component 113. In some embodiments, the zone block staging component 113 is part of the host system 110, an application, or an operating system. In other embodiments, local media controller 135 includes at least a portion of zone block staging component 113 and is configured to perform the functionality described herein.

The zone block staging component 113 can accumulate incoming blocks from a host system in a staging area (a conventional memory region) in the memory sub-system. When the accumulated blocks reach a granularity of the zone block, zone block staging component 113 can migrate the blocks to a zoned memory region. Further details with regards to the operations of the zone block staging component 113 are described below.

Figure 2:
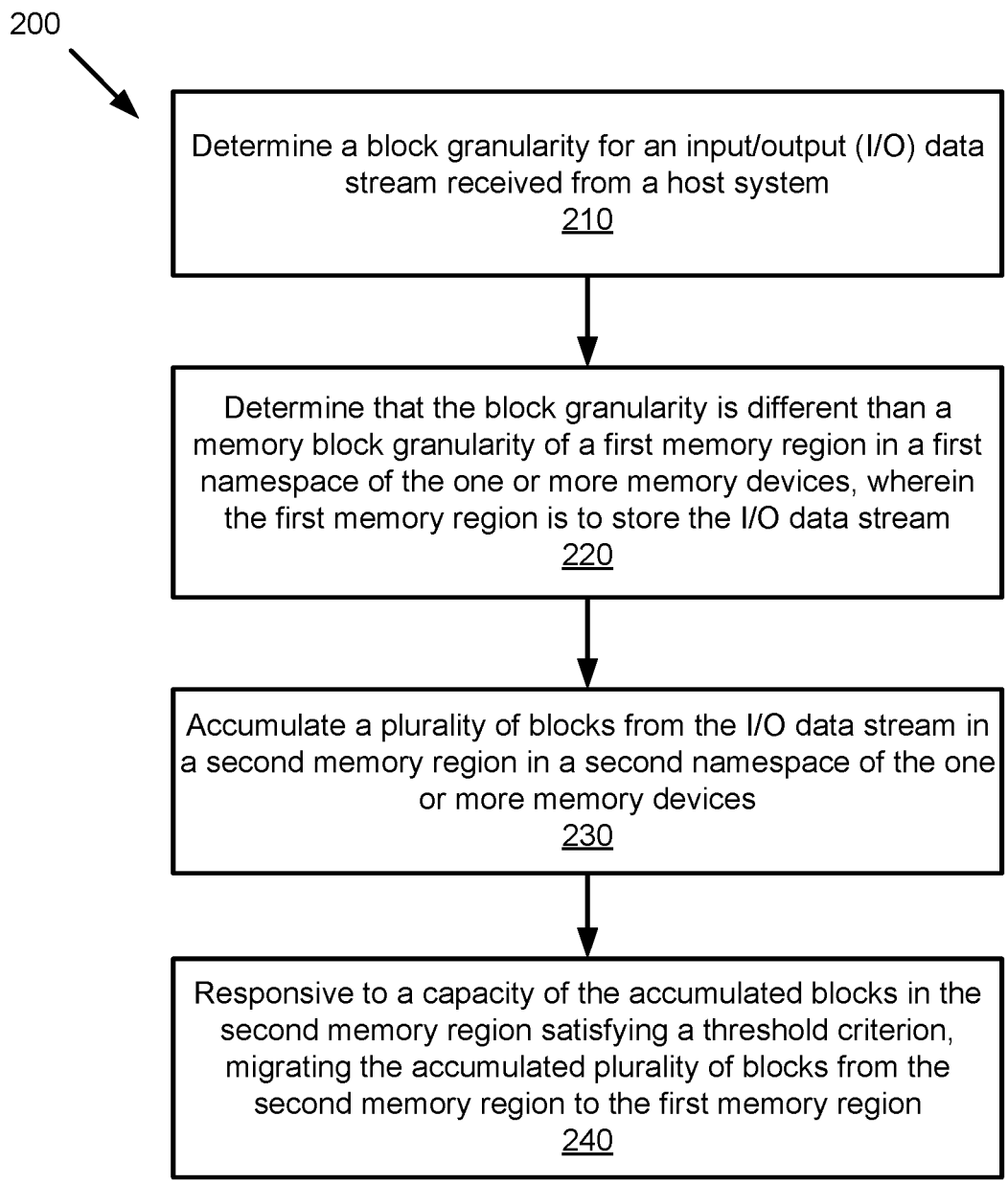
FIG. 2 is a flow diagram of an example method to perform zone block staging for a memory sub-system with a zoned namespace in accordance with some embodiments of the present disclosure.

FIG. 2 is a flow diagram of an example method 200 to perform zone block staging for a memory sub-system with a zoned namespace, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the zone block staging component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic determines a block granularity for an input/output (I/O) data stream received from a host system 120.

In one embodiment, the host system can program data to a memory sub-system 110 in a granularity specified by an operating system running on host system 120. In one embodiment, processing logic can send a request to an operating system of host system 120 to discover a page size, at runtime. From the page size information, processing logic can determine block granularity for an I/O stream from the host system to be a same granularity as the page size, for a particular I/O stream or for subsequent I/Os. In another embodiment, if processing logic received some blocks from the I/O stream and the block contains a size information, processing logic can parse the block for the block size. For example, in some embodiments, a block can have a header segment and data segment. Processing logic can obtain from the header segment a size information for the block as the block granularity.

At operation 220, processing logic determines that the block granularity is different than a memory (zoned) block granularity of a first (zoned) memory region in a first (zoned) namespace of the one or more memory devices, wherein the first (zoned) memory region is used to store the I/O data stream.

For example, given that blocks are to be programmed to a particular zone in a zoned namespace (zns) memory device, processing logic can access configuration settings for the memory devices configured with the zoned namespace. The configuration settings can include zone block size configurations. Processing logic can compare the zone block size against the I/O stream block granularity to determine that block granularity is different than zone block granularity.

At operation 230, processing logic accumulates (or stores) a plurality of blocks from the I/O data stream in a second memory region in a second namespace of the one or more memory devices.

Processing logic can identify a memory address range (a data chunk) in a conventional namespace that is not in use, where the memory range has the same size as a zone block. In one embodiment, the memory address range can include logical block addresses (LBA). Processing logic can map a data chunk to a zone by adding an entry to a mapping table that maps the data chunk to a zone by zone identifier, where the I/O blocks is to be programmed to the zone. Processing logic can then receive blocks from the I/O stream and accumulate the blocks in the data chunk.

At operation 240, responsive to a capacity of the accumulated blocks in the second memory region (data chunk) satisfying a threshold criterion (capacity of accumulated blocks is greater than or equal to the capacity of a zone block), processing logic migrates the accumulated blocks from the second memory region (data chunk) to the first memory region (zone block).

Once data in the data chunk is full, processing logic migrates (copy) data from the data chunk to the zone, using a write pointer of the zone. Next, processing logic reclaims the data chunk, and provisions the data chunk for subsequent usages. In one embodiment, data written to the data chunk can be random writes, while data written to a zone block in a zone has a sequential write.

Using the data chunks in the conventional namespace as a staging area, memory sub-system 110 comprising zns memory devices with a zone block granularity is compatible with conventional file systems that has a different block granularity than the zone block granularity.

Figure 3:
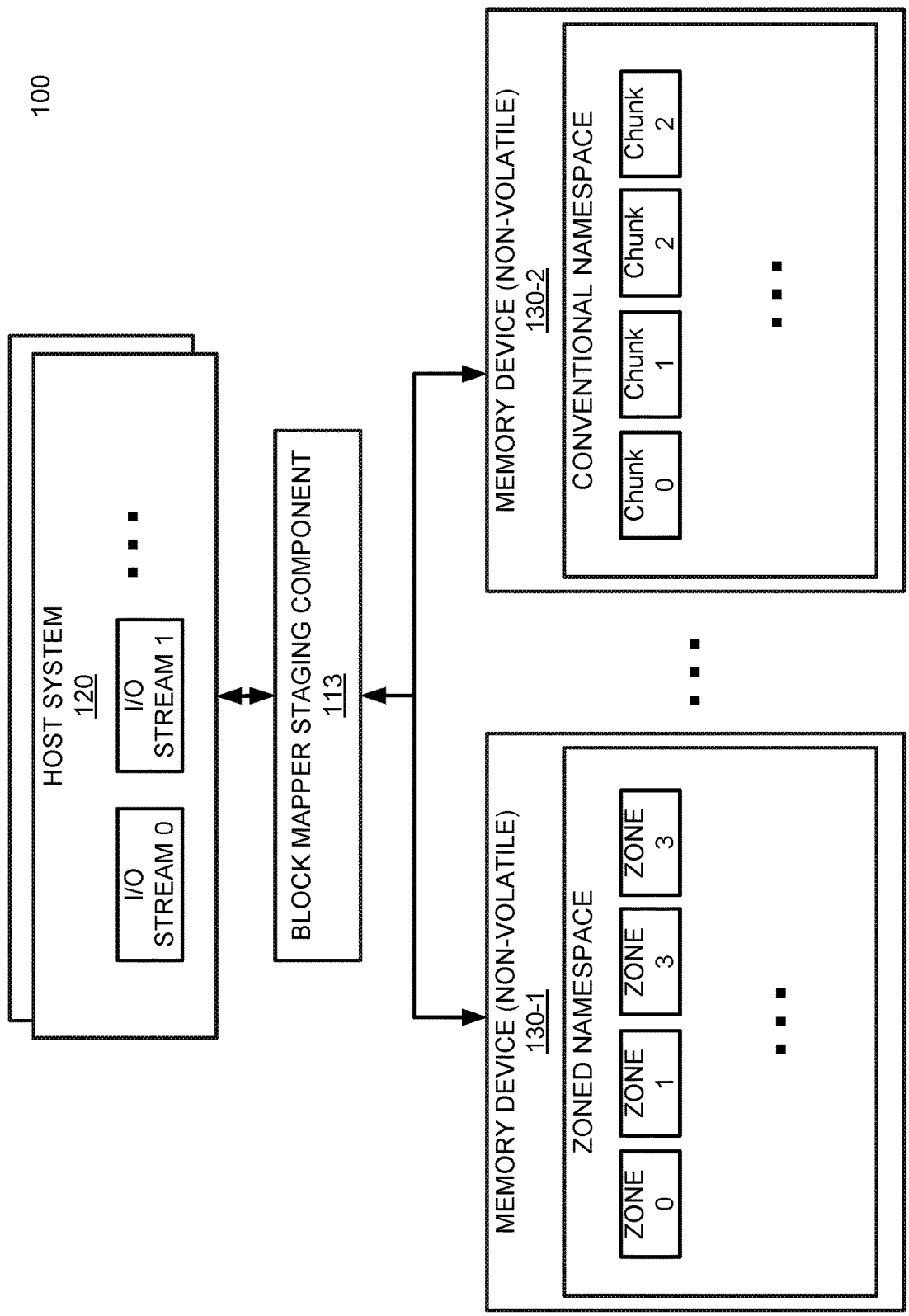
FIG. 3 is a block diagram illustrating a memory sub-system having memory devices with a zoned namespace and memory devices with a conventional namespace in accordance with some embodiments of the present disclosure.

FIG. 3 is a block diagram illustrating a memory sub-system having memory devices with a zoned namespace and memory devices with a conventional namespace in accordance with some embodiments of the present disclosure. In FIG. 3, host system 120 can include one or more I/O streams 0-1. I/O streams 0-1 can represent I/O accesses from a filesystem or standalone applications running on host system 120. I/O streams 0-1 can have a particular block granularity, based on a paging size of an operating system running on host system 120.

In one embodiment, zone block staging component 113 is configured to map I/O streams 0-1 from host system 120 to a zone in one or more memory devices 130 with a zoned namespace. For example, I/O stream 0 can be mapped to zone 0 in memory devices 130-1, where memory devices 130-1 is configured with a zone namespace. Because zone 0 has data granularity of a zone block size, and I/O stream 0 has a different data granularity, e.g., granularity of a 4 KB page size (or other multiples of 4 KB), a conventional memory region in memory device 130-2 with a conventional namespace can be used as a staging area by memory sub-system 110. The staging area supports a first (e.g., 4 KB) block granularity for read and/or write from host system 120 and a different zone block granularity (e.g., 64 KB) for read and/or write from a memory device 130-1 with a zoned namespace. In one embodiment, memory device 130-2 is configured with a conventional namespace and a memory region (or data chunk 0) in memory device 130-2 is allocated as the staging area. When a data chunk is allocated, zone block staging component 113 adds an entry to a mapping table, such as table 700 of FIG. 7, to map the data chunk by memory address to a zone. Here, the zone is a memory region in a zns memory device of memory sub-system 110 where I/O stream blocks are to be stored.

Figure 4:
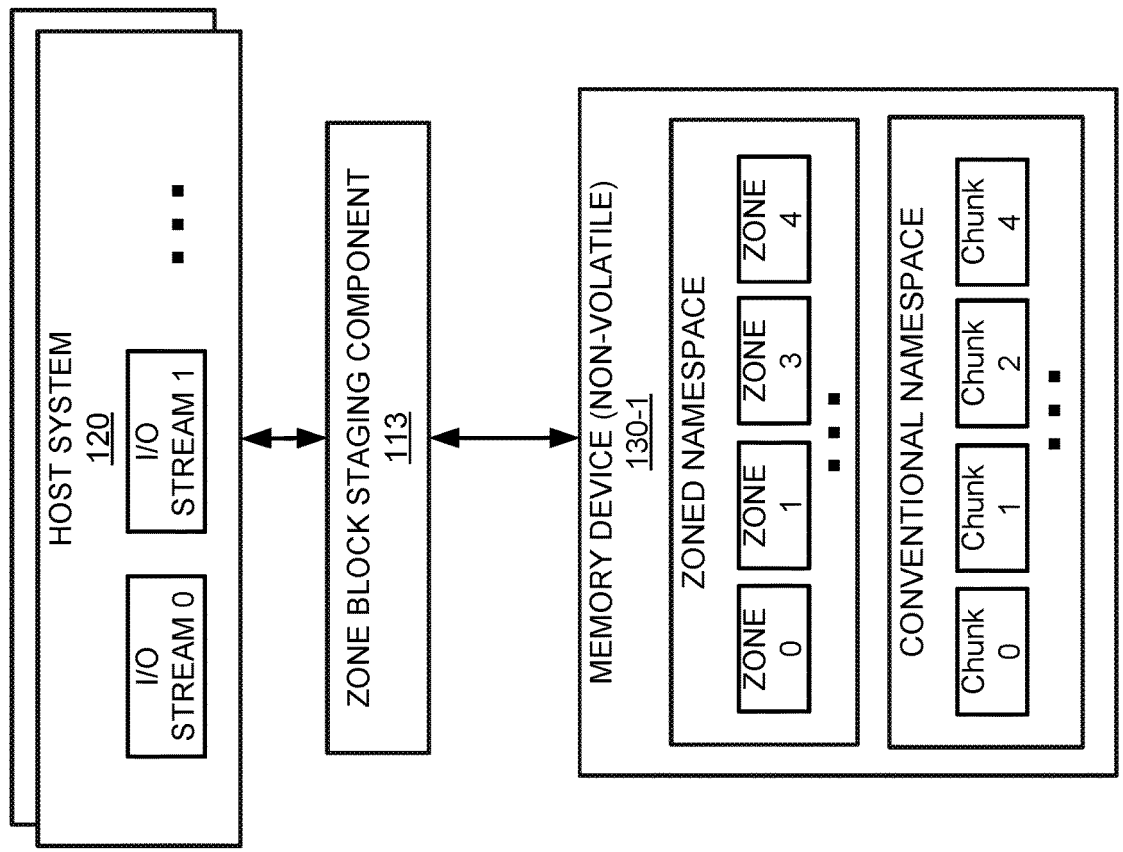
FIG. 4 is a block diagram illustrating a memory sub-system having memory devices with both a zoned and conventional namespace in accordance with some embodiments of the present disclosure.

FIG. 4 is a block diagram illustrating a memory sub-system having memory devices with both a zoned and conventional namespace in accordance with some embodiments of the present disclosure. In FIG. 4, host system 120 can include one or more I/O streams 0-1. I/O streams 0-1 can represent I/O accesses from a filesystem or standalone applications running on host system 120. I/O streams 0-1 can have a particular block granularity, based on a paging size of an operating system running on host system 120.

In one embodiment, zone block staging component 113 is configured to map I/O streams 0-1 from host system 120 to a zone of a zoned memory region in one or more memory devices 130. For example, component 113 can map I/O stream 0 to zone 0 of memory devices 130-1. Because zone 0 has data granularity of a zone block size (e.g., 64 KB), and I/O stream 0 has a different data granularity, e.g., granularity of a 4 KB page size (or other multiples of 4 KB), a conventional memory region can be used as a staging area by memory sub-system 110. The staging area can support a first (e.g., 4 KB) block granularity from host system 120 and a different zone block granularity (e.g., 64 KB) from memory device 130-1. In one embodiment, a separate partition of memory device 130-1 can be configured with a conventional namespace and a memory region (or data chunk 0) in memory device 130-1 is allocated as the staging area. When a data chunk is allocated, zone block staging component 113 can add an entry to a mapping table, such as table 700 of FIG. 7, to map the data chunk by memory address to the a zone where the I/O stream blocks are to be stored. Here, memory device 130-1 in FIG. 4 can be partitioned into at least two partitions, where one partition is configured with a conventional namespace and another partition is configured with a zoned namespace, whereas in FIG. 3, a different memory device, e.g., memory device 130-2, is configured with a conventional namespace.

Figure 5:
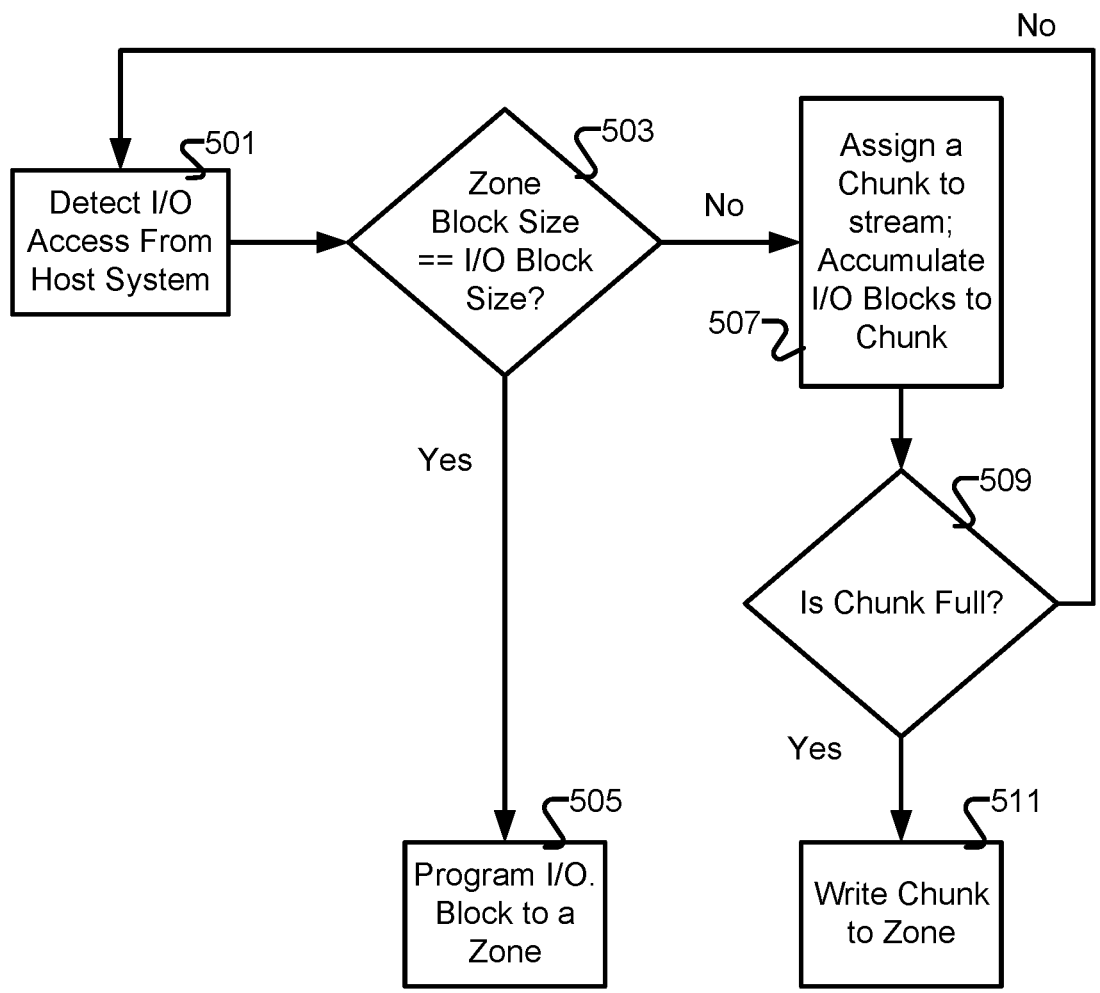
FIG. 5 is a flow chart illustrating zone block staging in accordance with some embodiments of the present disclosure.

FIG. 5 is a flow chart 500 illustrating zone block staging in accordance with some embodiments of the present disclosure. Operations 501-511 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, operations 501-

511 are performed by zone block staging component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, processing logic detects an I/O access from a host system. The I/O access can be an I/O stream write to a storage area (e.g., memory device 130-1) with a zoned namespace. Processing logic can allocate a zone, by zone identifier, to the I/O stream.

At block 502, processing logic determines whether the zone block size (data granularity for the zone) is equal to I/O block size (data granularity for input/output data communicated to memory device 130-1). In one embodiment, processing logic can query a memory controller for configuration settings for the allocated zone to determine data granularity (zone block size) of the allocated zone. In one embodiment, processing logic can query an operating system running on host system 120 to determine data granularity of the I/O stream (block size). In one embodiment, block size is a paging size for the operating system running on host system 120.

At block 505, if the zone block size is determined to be equal to the I/O block size, process logic programs the I/O blocks directly to the allocated zone, using a write pointer of the allocated zone. Here, zones are written sequentially.

At block 507, if the zone block size is determined to be different than the I/O block size, process logic prepares a staging area where blocks from the I/O stream can accumulate. For example, processing logic can allocate one or more available conventional memory address ranges from non-volatile memory with a conventional namespace. Processing logic can map a data chunk identifier to the one or more memory address ranges (by logical address number), and maps the data chunk identifier to the allocated zone, by zone identifier, as shown in table 700 of FIG. 7.

Once a mapping entry is added, blocks for an incoming I/O stream can be programmed to the memory address ranges corresponding to the data chunk. Here, processing logic can program the blocks for the I/O stream with a granularity of a conventional filesystem. In one embodiment, blocks can be programmed to the data chunk with a granularity of 4 KB. In one embodiment, blocks can be programmed to the data chunk in random accesses.

At block 509, processing logic determines whether the data chunk is full. In one embodiment, the data chunk is full if processing logic accesses a memory address beyond the memory address range(s) mapped to the data chunk.

At block 511, if the data chunk is full, processing logic migrates (copies) data from the data chunk to a zone, at a write pointer of the zone. Here, processing logic writes sequentially to a zone in a granularity of a zone block size. In one embodiment, a zone block has a granularity of 64 KB, 128 KB, or any other multiples of 4 KB.

Once migrated, processing logic reclaims the memory range(s) associated with the data chunk, and provisions the memory range(s) for other usages. In one embodiment, reclaiming a memory range includes freeing the memory range for other usages. In one embodiment, reclaiming a memory range includes erase data in the memory range.

Figure 6:
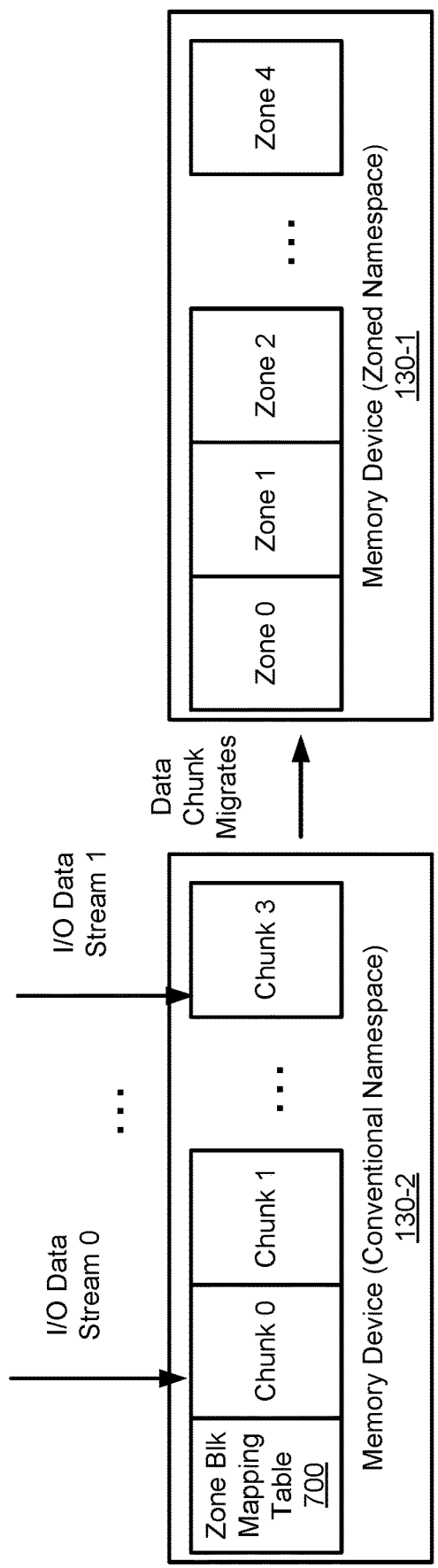
FIG. 6 illustrates block accumulation and migration in accordance with some embodiments of the present disclosure.

FIG. 6 illustrates block accumulation and migration in accordance with some embodiments of the present disclosure. In FIG. 6, zone block mapping table 700 can reside in a conventional memory region in memory device 130-2, where memory device 130-2 is configured with a conventional namespace.

In FIG. 6, memory device 130-2 can include one or more data chunks 0-3 as staging areas for one or more I/O streams. In one embodiment, one or more incoming I/O streams can simultaneously accumulate blocks to one or more chunk 0-3. Once a chunk is full, component 133 migrates a chunk to a zone in memory device 130-1, where the zone is mapped to the chunk via a mapping table, such as zone block mapping table 700. Although the conventional namespace is shown in memory device 130-2, separate partitions of memory device 130-1 can be configured with a conventional namespace and a zoned namespace.

FIG. 7 illustrates an example of a mapping table for data chunks to map to zone blocks in accordance with some embodiments of the present disclosure.

In one embodiment, table 700 can include mappings for logical block number, chunk identifier, and zone. The logical block number can indicate one or more logical blocks assigned to a particular chunk by chunk identifier, where the chunk is mapped to a particular zone, by zone identifier. In one embodiment, logical block numbers can be mapped to one or more memory address ranges, via a logical block addressing scheme (LBA). The chunk identifier and zone identifier can be identifiers used by a memory controller to access the data chunks and/or zones in one or more memory devices.

Figure 8:
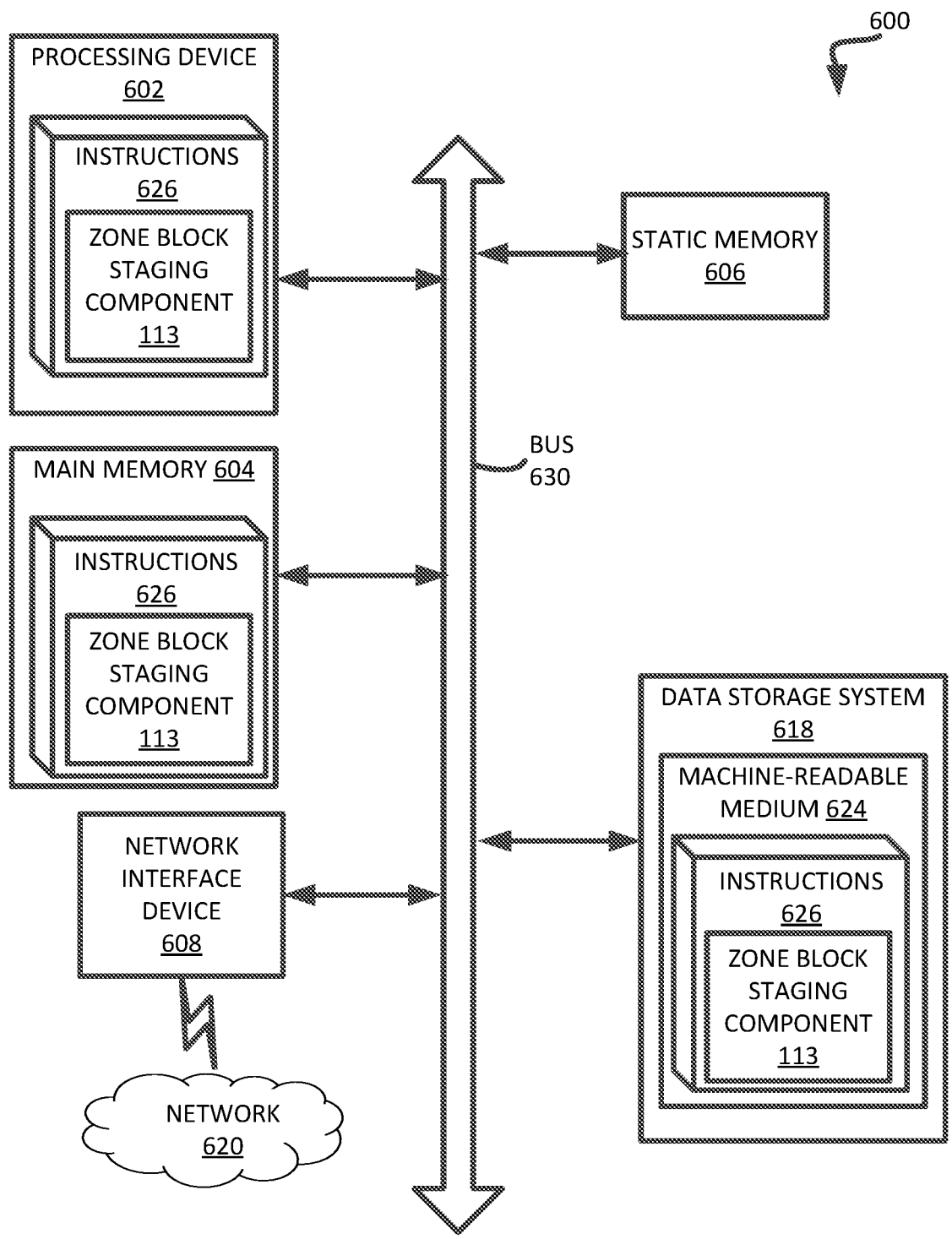
FIG. 8 is a block diagram of an example computer system in which embodiments of the present disclosure may operate.

FIG. 8 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the zone block staging component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a zone block staging component (e.g., the zone block staging component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
  one or more memory devices;
  a processing device, operatively coupled with the one or more memory devices, to perform operations comprising:
    accumulating a plurality of blocks from an input/output (I/O) data stream in a memory region of the one or more memory devices having a first namespace that is not a zoned namespace, wherein the memory region is configured to write data at a block granularity of the I/O data stream; and
    responsive to determining that a capacity of the accumulated blocks in the memory region having the first namespace is equal to or greater than a memory block granularity of a zoned memory region of the one or more memory devices, migrating the accumulated plurality of blocks from the memory region to the zoned memory region, wherein the block granularity of the I/O data stream is smaller than the memory block granularity of the zoned memory region.

2. The system of claim 1, wherein the zoned memory region is configured to accept sequential write operations and the memory region having the first namespace is configured to accept random write operations.

3. The system of claim 1, wherein the processing device is to perform operations further comprising:
 determining that the block granularity of the I/O data stream is different than the memory block granularity of the zoned memory region of the one or more memory devices, wherein the zoned memory region is to store the I/O data stream.

4. The system of claim 1, wherein the one or more memory devices comprise non-volatile memory devices, and wherein the zoned memory region and the memory region having the first namespace are located in the non-volatile memory devices.

5. The system of claim 1, wherein the processing device is to perform operations further comprising:
 reclaiming the memory region responsive to migrating the accumulated blocks from the memory region to the zoned memory region.

6. The system of claim 1, wherein the processing device is to perform operations further comprising:
 mapping the zoned memory region to the memory region having the first namespace using one or more mapping entries from a mapping table.

7. The system of claim 6, wherein the mapping table is stored in the first namespace in the one or more memory devices.

8. A method comprising:
 accumulating a plurality of blocks from an input/output (I/O) data stream in a memory region of one or more memory devices having a first namespace that is not a zoned namespace, wherein the memory region is configured to write data at a block granularity of the I/O data stream; and
 responsive to determining that a capacity of the accumulated blocks in the memory region having the first namespace is equal to or greater than a memory block granularity of a zoned memory region of the one or more memory devices, migrating the accumulated plurality of blocks from the memory region to the zoned memory region, wherein the block granularity of the I/O data stream is smaller than the memory block granularity of the zoned memory region.

9. The method of claim 8, wherein the zoned memory region is configured to accept sequential write operations and the memory region having the first namespace is configured to accept random write operations.

10. The method of claim 8, further comprising:
 determining that the block granularity of the I/O data stream is different than the memory block granularity of the zoned memory region of the one or more memory devices, wherein the zoned memory region is to store the I/O data stream.

11. The method of claim 8, wherein the one or more memory devices comprise non-volatile memory devices, and wherein the zoned memory region and the memory region having the first namespace are located in the non-volatile memory devices.

12. The method of claim 8, further comprising:
 reclaiming the memory region responsive to migrating the accumulated blocks from the memory region to the zoned memory region.

13. The method of claim 8, further comprising:
 mapping the zoned memory region to the memory region having the first namespace using one or more mapping entries from a mapping table.

14. The method of claim 13, wherein the mapping table is stored in the first namespace in the one or more memory devices.

15. A non-transitory computer-readable storage medium comprising instructions that, when executed by a processing device, cause the processing device to perform operations comprising:
 accumulating a plurality of blocks from an input/output (I/O) data stream in a memory region of one or more memory devices having a first namespace that is not a zoned namespace, wherein the memory region is configured to write data at a block granularity of the I/O data stream; and
 responsive to determining that a capacity of the accumulated blocks in the memory region having the first namespace is equal to or greater than a memory block granularity of a zoned memory region of the one or more memory devices, migrating the accumulated plurality of blocks from the memory region to the zoned memory region, wherein the block granularity of the I/O data stream is smaller than the memory block granularity of the zoned memory region.

16. The non-transitory computer-readable storage medium of claim 15, wherein the zoned memory region is configured to accept sequential write operations and the memory region having the first namespace is configured to accept random write operations.

17. The non-transitory computer-readable storage medium of claim 15, wherein the one or more memory devices comprise non-volatile memory devices, and wherein the zoned memory region and the memory region having the first namespace are located in the non-volatile memory devices.

18. The non-transitory computer-readable storage medium of claim 15, wherein the instructions cause the processing device to perform operations further comprising:
 reclaiming the memory region responsive to migrating the accumulated blocks from the memory region to the zoned memory region.

19. The non-transitory computer-readable storage medium of claim 15, wherein the instructions cause the processing device to perform operations further comprising:
 mapping the zoned memory region to the memory region having the first namespace using one or more mapping entries from a mapping table.

20. The non-transitory computer-readable storage medium of claim 19, wherein the mapping table is stored in the first namespace in the one or more memory devices.

* * * * *